(12) United States Patent
Kester et al.

(10) Patent No.: US 8,894,920 B2
(45) Date of Patent: Nov. 25, 2014

(54) METHODS AND APPARATUS FOR CASTING CERAMIC SHEETS

(75) Inventors: Lanrik Kester, Savona, NY (US); Thomas Dale Ketcham, Horseheads, NY (US); Brian Scott Kirk, Corning, NY (US); Dell Joseph St Julien, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 519 days.

(21) Appl. No.: 13/124,015

(22) PCT Filed: Oct. 29, 2009

(86) PCT No.: PCT/US2009/062495
§ 371 (c)(1),
(2), (4) Date: Apr. 13, 2011

(87) PCT Pub. No.: WO2010/051345
PCT Pub. Date: May 6, 2010

(65) Prior Publication Data
US 2011/0198785 A1    Aug. 18, 2011

Related U.S. Application Data

(60) Provisional application No. 61/197,955, filed on Oct. 31, 2008.

(51) Int. Cl.
| B28B 5/00 | (2006.01) |
| B28B 11/24 | (2006.01) |
| C04B 35/64 | (2006.01) |
| C04B 33/32 | (2006.01) |
| C04B 33/28 | (2006.01) |

(52) U.S. Cl.
USPC ................ 264/650; 264/660; 264/677

(58) Field of Classification Search
CPC .. B28B 5/027; B28B 11/243; C04B 35/6263; C04B 35/486; C04B 2235/6025; C04B 2235/606
USPC .......................... 264/650, 660, 677
See application file for complete search history.

(56) References Cited

U.S. PATENT DOCUMENTS 4,353,958 A * 10/1982 Kita et al. ............. 428/329
5,051,219 A *  9/1991 Miller .................. 264/40.7

(Continued)

OTHER PUBLICATIONS

Dec. 24, 2012 Office Action and Search Report issued in counterpart CN Application No. 200980143708.X.

*Primary Examiner* — Erin Snelting
(74) *Attorney, Agent, or Firm* — Svetlana Short

(57) ABSTRACT

A method for making a thin, free-standing ceramic sheet may include drawing a carrier film proximate a casting head and across a casting bed of a tape caster at a rate from about 2 cm/min to about 500 cm/min. Depositing a thin film of ceramic slip less than about 150 μm on the carrier film with the casting head. The ceramic slip may comprises a ceramic powder with an ultimate crystallite size of less than about 10 μm dispersed in a fluid vehicle such that the ceramic slip has a ceramic solids fraction of greater than about 20% by volume. The deposited ceramic slip may be dried on the carrier film thereby forming a green ceramic sheet on the carrier film. After the green ceramic sheet is dried, the green ceramic sheet may be sintered.

17 Claims, 2 Drawing Sheets

(56) References Cited

U.S. PATENT DOCUMENTS

| | | |
|---|---|---|
| 5,089,455 A | 2/1992 | Ketcham et al. |
| 5,273,837 A | 12/1993 | Aitken et al. |
| 5,306,646 A * | 4/1994 | Lauf ............................ 438/71 |
| 5,814,262 A | 9/1998 | Ketcham et al. |
| 5,904,892 A | 5/1999 | Holmes |
| 6,344,426 B1 * | 2/2002 | Hata et al. ..................... 501/103 |
| 6,447,712 B1 | 9/2002 | Dogan et al. |
| 6,682,598 B1 * | 1/2004 | Steinmueller et al. .......... 118/58 |
| 7,695,580 B2 | 4/2010 | Cutler et al. |
| 2005/0095482 A1 | 5/2005 | Garner et al. |
| 2006/0113034 A1 | 6/2006 | Seabaugh et al. |
| 2006/0134488 A1 * | 6/2006 | Cortright et al. ................ 429/30 |
| 2007/0042225 A1 | 2/2007 | Seabaugh et al. |

* cited by examiner

METHODS AND APPARATUS FOR CASTING CERAMIC SHEETS

This application claims the benefit of, and priority to U.S. Provisional Patent Application No. 61/197,955 filed on Oct. 31, 2008, the content of which is relied upon and incorporated herein by reference in its entirety.

Parts of this invention were made with Government support under Agreement No. 70NANB4H3036 awarded by the US Department of Commerce. The Government may have certain rights in some of the claims of the invention.

FIELD OF THE INVENTION

The present invention relates to methods and apparatus for forming ceramic sheets and, more specifically, to methods and apparatus for forming flexible ceramic electrolyte sheets by casting.

BACKGROUND OF THE INVENTION

Thin, flexible sintered structures, such as sintered ceramic sheets, have a wide variety of practical applications. For example, flexible sintered structures may be used in electronic and/or electro optic applications, such as waveguides, or as substrates for electronic coatings, superconductors, or high temperature superconductors. Flexible sintered ceramic structures may also be useful as a protective layer for glass or other substrate materials where a layer of protection is needed to resist scratching of the substrate. More notably, flexible sintered ceramic sheets or tapes may also be used as an electrolytic catalyst in solid oxide fuel cells.

Current methods for producing thin, flexible sintered ceramic sheets include casting a ceramic slip onto a carrier film to produce a green ceramic sheet or tape. The ceramic slip may be applied to the carrier film using a slot die, roll coater, doctor blade, comma bar or other, similar devices and techniques. The ceramic slip is then dried thereby forming a green ceramic sheet or tape on the surface of the carrier film. Thereafter, the ceramic sheet or tape is removed from the film and fired thereby forming a thin, flexible sintered ceramic sheet or tape.

Producing thin, flat sintered ceramic sheets of area greater than about 100 $cm^2$ having a thickness less than about 45 microns, without resorting to pressure during firing, requires a unique combination of shrinkage and process stress control strategies. The key is to deliver a uniform material at each step in the process. Without this uniformity, an unconstrained body will curl during firing. Non-uniformity in the green body, or in firing, of only 1% from the top of the green sheet to the bottom of the green sheet can yield a curl radius of about 3 mm for a 20 micron thick zirconia electrolyte sheet if all the non-uniformity is converted to differential strain/shrinkage during sintering. Due to "back-stresses" during sintering, all the non-uniformity will not be converted into differential strain and hence curl or warping. Under such conditions, the level of differential shrinkage and curl or warping will yield a curl radius on the order of about 3-10 mm for a 1% shrinkage variation. To obtain thin flat electrolyte sheets, density/sintering shrinkage variations of significantly less than 1% are desirable. However, the application of constraints, such as stacking with release powder, introduces either residual release powder on the body or defects within the body. Such techniques have been applied to thicker bodies. The goal of the present invention is to provide a commercially viable approach that produces large area, thin electrolyte sheet in high yield with minimal defect.

While the aforementioned techniques are suitable for forming thin, flexible sintered ceramic structures, defects such as cracks or holes introduced in the green ceramic sheet or tape during the casting process may render the green ceramic sheet or tape unsuitable for further processing.

Accordingly, a need exists for improved methods and apparatus for casting green ceramic sheets for use in forming thin, flexible, sintered ceramic sheets.

SUMMARY OF THE INVENTION

In one embodiment, A method for making a thin, free-standing ceramic sheet may include drawing a carrier film proximate a casting head and across a casting bed of a tape caster at a rate from about 2 cm/min to about 500 cm/min. Depositing a thin film of ceramic slip on the carrier film with the casting head. The thin film of ceramic slip deposited on the carrier film may be less than about 150 µm thick and greater than about 15 cm wide. The thin film of ceramic slip may comprises a ceramic powder with an ultimate crystallite size of less than about 10 µm dispersed in a fluid vehicle such that the ceramic slip has a ceramic solids fraction of greater than about 20 wt. %. The deposited ceramic slip may be dried on the carrier film as the carrier film is drawn through a drying chamber of the tape caster thereby forming a green ceramic sheet on the carrier film. The drying chamber may be maintained at a temperature from about 0° C. to about 150° C. and air may be passed through the drying chamber at a rate from about 40 ft./min to about 3,000 ft./min. After the green ceramic sheet is dried, the green ceramic sheet may be sintered on roughened setters. No extra weight may be placed on the green ceramic sheet during sintering. The resulting thin, free-standing ceramic sheet does not contain any non-periodic holes of greater than about 10 µm in diameter, any non-periodic point defects greater than about 10 µm in diameter or any cracks greater than 10 µm in length.

In another embodiment, a casting apparatus for forming thin, free-standing green ceramic sheets may comprise a casting bed, a casting head, carrier film supports, a drying chamber, a carrier film delivery roll, a carrier film take-up roll and a static dissipative device. The drying chamber may be positioned over and encloses the casting bed and comprises an exhaust. The interior of the drying chamber is maintained at a temperature of about 0° C. to about 150° C. and the exhaust is operable to move air through the drying chamber from about 40 ft. min to about 1,300 ft./min. The carrier film supports may be positioned in the drying chamber and over the casting bed of the tape caster such that carrier film drawn across the casting bed may be elevated and supported over at least 50% of the casting bed. The carrier film delivery roll may be positioned proximate an entrance of the casting bed. The carrier film take-up roll may be positioned proximate an exit of the casting bed and may be operable to draw carrier film across the casting bed from about 2 cm/min to about 500 cm/min. The static dissipative device may be positioned proximate the carrier film delivery roll or the carrier film take-up roll such that the carrier film passes proximate static dissipative device. The casting head may be positioned proximate the carrier film delivery roll such that carrier film drawn from the carrier film delivery roll passes proximate the casting head before entering the casting bed, wherein the casting head may be operable to deposit a thin film of ceramic slip on the carrier film, the ceramic slip comprising a ceramic powder with an ultimate crystallite size of less than about 10 µm dispersed in a fluid vehicle such that the ceramic slip has a ceramic solids fraction of greater than about 20%, the thin film of ceramic slip comprising a thickness of less than about 150 μm and a width greater than about 15 cm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The embodiments set forth in the drawings are illustrative in nature and not intended to be limiting of the invention defined by the claims. Moreover, the following description of the specific illustrative embodiments of the present invention can be understood when read in conjunction with the following drawings where similar structure is indicated with like reference numerals and in which:

DETAILED DESCRIPTION OF THE ILLUSTRATIVE EMBODIMENTS

Figure 1:
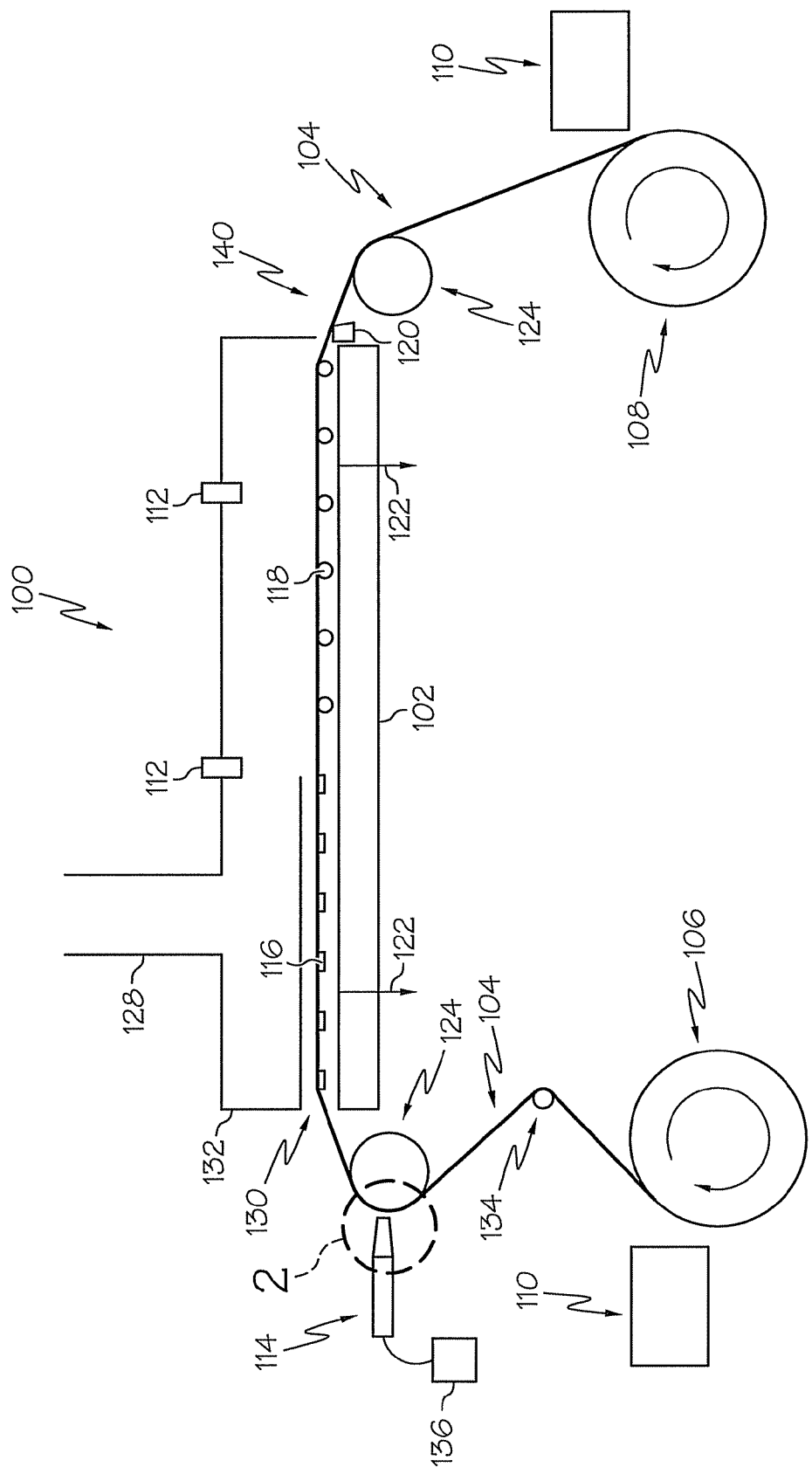
FIG. 1 is a schematic diagram of a cross section of a tape caster for casting thin, flexible green ceramic sheets according to one or more embodiments shown and described herein.

The methods and apparatus described herein relate to forming thin (e.g., less than 45 microns thick) flexible ceramic electrolyte sheets, such as yttria-stabilized zirconia ceramic sheets, that may be used in conjunction with solid oxide fuel cell devices. FIG. 1 shows one embodiment of a tape caster apparatus for forming such ceramic sheets. The tape caster generally comprises a casting bed, a casting head, a drying chamber, carrier film supports, carrier film delivery and carrier film take-up rolls, and one or more devices for dissipating or mitigating static build-up on the carrier film. A ceramic slip for forming the green ceramic sheets, the tape caster and methods for using the tape caster will be described in more detail herein.

The flexible ceramic electrolyte sheets described herein are formed using the tape caster shown in FIG. 1 to apply a ceramic slip to a carrier film traversing across the tape caster. The ceramic slip generally comprises ceramic powders suspended in a slip vehicle such as a fluid. The slip vehicle may include a volatile liquid material.

The liquid material for the slip may contain at least one solvent and at least one binder which dissolves in or is dispersed in the solvent. The binder may include, for example, poly vinyl alcohol, acrylics, poly vinyl butyral, poly ethylene oxide and polyethylene glycols of various molecular weights, polyvinyl pyrrolidone, cellulosics such as hydroxymethylcellulose, hydroxyethylcellulose and hydroxyproplycellulose, gums such as agar gum and gum Arabic, acrylics, vinylacrylics, acrylic acids, polyacrylamides, starches or other combinations and permutations of binders known in the art. Alternately, the slip may contain an emulsion such as an acrylic emulsion with an aqueous liquid. Alternately, the slip may contain one or more binder precursors which form the binder upon heating, drying or exposure to radiation, such as acrylics such as poly methyl methacrylate, or condensation polymers, such as polyfunctional acids and glycols. In addition, the slip may contain a low vapor pressure plasticizer, such as dibutyl phthalate, butyl phenyl phthalate, low molecular weight poly ethylene glycol, or other plasticizers, which may lower the glass transition temperature ($T_g$) or improve the plasticity of the particular binder so as to make the green tape less brittle during handling or subsequent forming. In general, increasing the plasticizer content lowers the $T_g$. However, if the $T_g$ is too low then the tape will be difficult to handle due to low strength or insufficient resistance to deformation from handling.

In the present invention, it is preferred that the green tape be stiff enough to be self supporting without deformation for handling after release from the carrier. This is achieved by maintaining a $T_g$ for the binder of between −50° C. and 100° C., more preferably between −10° C. and 50° C. This is achieved in the polyvinyl butyral/dibutyl phthalate binder system by a relatively high ratio of binder to plasticizer, typically greater than 0.5 by weight and more preferably between 1 and 3.5 and more preferably between 1.25 and 2.5. Other ratios will be found to be appropriate for other polymer/plasticizer systems. For example, poly butyl methacrylate has a $T_g$ low enough to require little or no plasticizer to obtain a $T_g$ below 30° C. In the polyvinyl butyral/dibutyl phthalate system, a ratio of around 2 typically enables good handling of the tape. Dynamic Mechanical Spectroscopy (DMS) measurement of green tape made using polyvinylbutyral and dibutyl phthalate shows two transition temperatures, one between 0° C. and 3° C. and a second between 30° C. and 100 C. Examples are shown in the Table 1 below. These measurements were made on green tape supported by a poly methyl methacrylate fugitive carrier.

TABLE 1

| | | | Binder/Plasticizer Ratios and Glass Transition Temperatures | | | |
|---|---|---|---|---|---|---|
| Sample | Binder (g) | Plasticizer (g) | Ratio (binder/plasticizer) | Zirconia (g) | First transition (° C.) | Second transition (° C.) |
| 1 | 3.50 | 2.80 | 1.25 | 70.15 | Not observed | 53 |
| 2 | 5.05 | 3.37 | 1.50 | 84.17 | 6 | 68 |
| 3 | 4.98 | 2.45 | 2.03 | 82.98 | 15-17 | 66-83 |

The two transitions are thought to be due to the inherent binder system softening and the softening of the composite binder/zirconia of the green tape. The overall stiffness of the green tape may be adjusted by adjusting either the binder/plasticizer ratio or by adjusting the ratio of binder plus plasticizer to ceramic powder. In general, raising the ratio of binder-plasticizer to powder will cause the overall tape plasticity to more closely resemble that of the binder-plasticizer alone. The binder/powder ratio is preferably between about 0.01 and about 0.2 and, more preferably, the ratio is between about 0.03 and about 0.1 such that the green ceramic body has sufficient strength and plasticity during firing while minimizing excessive shrinkage. Ratios of 0.05 and 0.06 are shown in the table above.

A lower handling temperature may also be achieved by the addition of non-volatilized residual liquid of intermediate boiling point. In the latter case it is preferred that a residual amount of solvent remains after the initial drying so that it acts to further plasticize the polymer. This liquid need not be a good solvent for the binder but must serve to sufficiently plasticize prior to sintering. The amount to which the $T_g$ is lowered is determined by both the binder/plasticizer ratio and by the binder/residual-liquid ratio. Examples of suitable solvents include alcohols, ketones, acetates, ethers, glycols, glycol ethers or solvents with mixed functionality with high boiling points and/or low evaporation rates. This can include 1-butanol, 2-methyl-1-propanol, 2-pentanol, terpineol or other high boiling alcohols. Preferred are the glycols and glycol ethers such as ethylene glycol, propylene glycol, 2-methoxy ethanol, 2-ethoxy ethanol, and other high boiling alcohols. These examples are not meant to limit the possible combinations of polymer, solvent and plasticizer but to illustrate what may be further known to those versed in the art.

A third class of volatile liquid may be employed with a low boiling point or high evaporation rate. For polyvinyl butyral binders these may include methanol, ethanol, 1-propanol, 2-propanol, acetone, methyl ethyl ketone and other solvents having vapor pressures at 25° C. of five or more torr and boiling points below 100° C. These solvents serve to reduce the drying time and thus equipment costs as fewer drying steps are required. Table 2 shows a list of possible volatiles that may be employed.

In summary, the slip may contain a binder and optionally a plasticizer or high-boiling solvent, and a low-boiling solvent. By appropriate selection of the solvent, binder and plasticizer, a green ceramic sheet may be produced with sufficient plasticity and adequate stiffness for handling. In one application of this invention, a slip is made using a low boiling solvent, intermediate boiling solvent, and a plasticizer. After drying at below 100° C. the low boiling solvent has been removed and at least a portion of the intermediate solvent remains along with the plasticizer. The sheet is further dried to remove the remaining intermediate boiling solvent and released from the carrier film. Upon release the green tape may be handled without either brittle failure or unwanted deformation. The sheet is then placed on an alumina setter and fired to form the final electrolyte.

TABLE 2

Volatiles which may be used in the Binder Plasticizer System

| | bp (° C.) | p (torr) | P (kPa) | Evaporation rate vs. t-Butanol |
|---|---|---|---|---|
| Methanol | 64.5 | 16.9 | 127.0 | 2.10 |
| Ethanol | 78.3 | 7.87 | 59.0 | 1.60 |
| 1-Propanol | 97.1 | 2.80 | 20.99 | 0.86 |
| 2-Propanol | 82.2 | 5.78 | 43.2 | 2.30 |
| 2-Methyl-2-propanol | 82.3 | 5.637 | 42.28 | 1.30 |
| 2-Butanol | 99.5 | 2.317 | 17.4 | 0.81 |
| 2-Methyl-1-propanol | 107.9 | 1.527 | 11.45 | 0.62 |
| 1-Butanol | 117.7 | 0.91 | 6.83 | 0.43 |
| 2-pentanol | 119.0 | 0.777 | 5.83 | |
| 3-Methyl-1-butanol | 130.5 | 0.316 | 2.37 | |
| 1-pentanol | 136-138 | 0.293 | 2.20 | |
| 1-Hexanol | 157.0 | 0.11 | 0.82 | 0.05 |
| Terpineol | 217.5 | 10 (94) | 1.3 | |
| 1,2 Ethanediol | 197.5 | 0.0878 | 0.0117 | <0.01 |
| 1,2 Propanediol | 187.6 | 0.133 | 0.0177 | 0.01 |
| 1,3 Propanediol | 214.4 | 10 (106.2) | 1.3 | |
| 1,3 Butanediol | 207.5 | 0.06 (25) | 0.008 | |
| 1,4 Butanediol | 228 | 10 (122.9) | 1.33 | |
| 2,3-Butanediol | 179-182 | 0.38 | 0.51 | |
| Hexylene glycol | 197.5 | 10 (94) | 1.33 | <0.01 |
| 2-Methoxyethanol | 124 | 9.7 | 1.3 | 0.52 |
| 2-Ethoxyethanol | 135.6 | 5.3 | 0.71 | 0.38 |
| 2-Butoxyethanol | 170.2 | 0.852 | 0.114 | 0.07 |
| Acetone | 56.1 | 231.06 | 30.8 | 5.59 |
| Methylethylketone | 79.6 | 90.6 | 12.1 | 3.8 |

In one embodiment, the ceramic powders used to form the given ceramic sheet may comprise a solid electrolyte such as zirconia or yttria-stabilized tetragonal zirconia polycrystals (3Y TZP). However, it should be understood that other solid electrolytes or combinations of solid electrolytes and/or ceramic powders may be used. The ceramic powders may generally comprise an ultimate crystallite size of less than 10 microns. For example, the ceramic powders may have a mean particle size of less than about 1 micron with less than about 10% of the particles being greater than 5 microns. More preferably, the mean particle size may be less than about 0.4 microns with less than about 10% of the particles being greater than about 1 micron. These fine ceramic powders are typically produced as easily dispersed agglomerates of 10 to 100 microns. These agglomerates may consist of smaller agglomerates that are not easily dispersed, or of single particles. The critical particle size of importance is not the easily dispersed agglomerate size, but the so called "hard" agglomerate or individual particle size. For 3Y TZP powders, the hard agglomerates may be made up of even smaller particles on the order of about 0.02 microns while the hard agglomerates themselves are typically on the order of 0.2 to 0.4 microns in diameter. The nature of 3Y TZP is that the grain size of the fired body determines a wide range of material properties. Both the ease of transformation from tetragonal to monoclinic, and the ease of degradation in moist environments, are a function of the 3Y TZP grain size. It has been found that the embodiments described herein produce a fired body with a grain size that is both narrow and fine (preferably less than about 0.5 microns and more preferably less than about 0.3 microns), with no more than 15% of the grains greater than about 0.6 microns. Further, the fired body will preferably have no tetragonal grains of greater than about 2 microns and, more preferably, no tetragonal grains of greater than about 1 micron. Some of the grains in the fired body may be cubic grains which are usually larger than the tetragonal grains in the 3Y TZP.

The ceramic powders are then beneficiated to refine or narrow the particle size distribution. Beneficiation may be performed using a solvent system that provides both the needed dispersive properties as well as good drying characteristics. The solvent systems chosen also depend on the binder chosen, as discussed above. For a poly-vinylbutyral binder (PVB), such as Monsanto B-98 (or its replacements) ketone, ester or alcohol based solvent systems are preferred. The vapor pressures and drying rates of the typical ketones (acetone and methyl ethyl ketone) are high and it is therefore more difficult to control the uniformity of the green ceramic sheet formed from a ceramic slip of the ceramic powders during and after drying. Alcohols and, more specifically, mixtures of alcohols, such as methanol, ethanol, 1-butanol, and the like, dry at slower rates and may be more useful for forming the green ceramic sheet. A mixture of a low molecular weight faster drying alcohol, such as ethanol, with a higher molecular weight, slower drying alcohol, such as 1-butanol, provides a system that can be adjusted to fine tune the drying rate. It has been found that the addition of small amounts of water (less than 10% of the total solvent by weight, more preferably from about 3% to about 7%), will both stabilize the process of forming the green ceramic sheet and enhance the rate of dissolution of the binder, PVB.

The low molecular weight fast drying alcohol constituent has a preferred concentration from about between 30 wt. % to about 90 wt. %, More preferably from about 50 wt. % to about 80 wt. % and, most preferably, from about 70 wt. % to about 75 wt. % for alcohols with evaporation rates 1 to two times that of t-butanol (e.g., with evaporation rates similar to ethanol) and about 50 wt. % to about 75 wt. % for solvents with evaporation rates similar to that of methanol (2 times greater than t-butanol). An alcohol, glycol, or glycol ether, with a lower evaporation rate may be used to slow the drying rate, improve uniformity in drying and limit density variation across the cast tape. In the typical slip, both butanol and propylene glycol act to lower the evaporation rate. Preferred total concentration for the more slowly drying solvents with evaporation rates less than that of t-butanol is from about 0 wt. % to about 60 wt. %, more preferably between about 10 wt. % and about 30% and, most preferably, between about 15 wt. % and about 25 wt. % when the faster evaporating solvent has a rate of between 1 and 2 times that of t-butanol. A higher concentration is used when the main constituent has a higher evaporation rate, as with methanol (a solvent with evaporation rate greater than 2 times that of t- butanol) versus ethanol where the slower drying solvent is preferred to be in the range of about 30 wt. % to about 60 wt. %. In addition, solvents with enhanced dipole strength and hydrogen bonding may be added. Preferred members of this family include glycols and alcohol ethers as described. Preferred concentrations of these solvents is between about 0.1 wt. % and about 60 wt. %, more preferably between about 1 wt. % and about 30 wt. %, most preferably between about 3 wt. % and about 10 wt. %. These may also act as a slowly drying solvent component wherein the preferred ranges for slowly drying solvents described above would apply.

It has also been found that solvents used to form the ceramic slip should be chosen so as to provide adequate dipole strength and hydrogen bonding to improve ceramic particle dispersion. Such solvents may include ethanol ethers such as 2-Methoxyethanol, 2-Ethoxyethanol, 2-Butoxyethanol, as well as the diols such as 1,2 Ethanediol, 1,2 Propanediol, 1,3 Propanediol, 1,3 Butanediol, 1,4 Butanediol, 2,3-Butanediol, and higher molecular weight diols. These materials are particularly good at dispersing ceramic powders due to their bi-dentate nature having either an ether and alcohol functionality or two alcohol functionalities. The compounds with oxygen groups separated by 2 carbons have been found to be the most effective for dispersion of 3Y TZP. It has been found using diffuse reflectance Fourier transform infrared spectroscopy (FTIR) that materials such as 2-Methoxyethanol, displace alcohols from the surface of the ceramic and are thus more highly bound. These bi-dentate compounds also are higher boiling and may be used to adjust the drying rate. Their use is limited by the solubility of the binder in them. For example, PVB will swell in neat 1,2 Propanediol (propylene glycol) but not dissolve. However, PVB may dissolve in mixtures of 1,2 Propanediol and ethanol or 1,2 Propanediol, ethanol, and 1-butanol. Mixtures containing 1,2 Propanediol and ethanol are preferred solvent mixtures due to the balance of dispersive character, drying rate, and binder solubility.

One or more dispersants are typically added to the solvent/powder mixture during beneficiation. These dispersants are widely known in the art and depend upon the surface chemistry of the ceramic as well as the solvent being used. For 3Y TZP, one class of dispersants found to be useful are phosphate esters, such as the Emphos products from such as PS 236 produced by Akzo-Nobel. The dispersant in the 3Y TZP system provides steric hindrance between particles and prevents gelation due to particle-particle interactions. The dispersant may be chosen so as to not substantially reduce the Zeta Potential (e.g., the electro-kinetic potential between the ceramic particles) while facilitating the gel being broken through steric hindrance. A gel is typically a weakly bound particle-particle network that produces an essentially rigid, free-standing solution. This gel can be "broken" through agitation to provide a free-flowing liquid. The gel may reform after agitation.

In one embodiment, the slip vehicle comprises ethanol, butanol, propylene glycol, water and a dispersant such as a phosphate ester. In this embodiment, the slip vehicle may comprise (in wt. % of the ceramic slip) more than about 70 wt. % ethanol and, more preferably, more than about 75 wt. % ethanol. The amount of butanol in the slip vehicle may be from about 10 wt. % to about 20 wt. %. The amount propylene glycol may be less than about 6 wt. %. The amount of water in the slip vehicle may be about 5% wt. %. The amount of the phosphate ester may be less than about 6 wt. % and, more preferably, less than about 4 wt. %. It should be noted that the amount of phosphate ester is by powder weight. In one embodiment, phosphate ester is phosphalon 236.

In another embodiment, the slip vehicle comprises methanol and 2-methoxyethanol. In this embodiment the amount of methanol in the slip vehicle (in wt. % of the ceramic slip) is about 54 wt. % while the amount of 2-methoxyethanol is about 46 wt. %.

While specific reference has been made herein to a slip vehicle comprising a mixture of butanol, propylene glycol and phosphate ester, it should be understood that other slip vehicles comprising other mixtures of volatile fluids may be used as the slip vehicle.

To combine the ceramic powders with the slip vehicle, the ceramic powders may be milled with the slip vehicle and dispersant in the presence of milling media. For example, when the ceramic powders are 3Y TZP, the 3Y TZP powders may be milled with the slip vehicle in the presence of zirconia milling media. The dispersed slip is milled using a vibratory mill (such as a SWECO M-18), an attrition mill or similar device. For example, using a vibratory mill, the powder/solvent mixture may be milled for between 1 and 5 days, more typically for about 72 hours. Milling breaks up any soft agglomerates and partially breaks down the hard agglomerates.

In one embodiment, the powder may be further beneficiated by Stokes settling. A polyethylene jar of the milled powder/solvent mixture (e.g., the ceramic slip) may be left to settle for 72 hours during which time a majority of the particles or agglomerates over 1 micron settle out. The fluid portion of the ceramic slip is transferred to a second bottle and settled for an additional 24 hours after to allow agglomerates over 1 micron to settled out. However, it should be understood that some larger agglomerates may remain due to transfer inefficiencies. In general, electron micrographs of green ceramic tape made according to the method described herein do not indicate the presence of a substantial number of ceramic particles over 1 micron.

Control of slip viscosity, after addition of a binder, may be achieved through addition of an agent designed to reduce the surface charge on the particle, while displacing some or all of the dispersant. In one embodiment, the addition of a small, controlled amount of diluted organic acid provides this reduction in surface charge. The acid is diluted so as to provide a more uniform distribution and to prevent locally high concentrations of ceramic particles which lead to inhomogeneous reaction with the powder and formation of "hard" agglomerates also known as flocs, flocculated particles, or precipitates. Although all organic acids will serve this function, it was found that acetic acid provides the right balance of providing charge reduction while not inducing local precipitation of the powder from the solvent. In one embodiment, the charge-modifying agent may comprise acetic acid and/or a combination of acetic acid with 2-propanol. For example, acetic acid diluted 1:1 with 2-propanol may be used. However, it should be understood that various other organic acids may be used including other combinations of acetic acid with 2-propanol. In one embodiment, the addition of the charge-modifying agent may increase the viscosity of the ceramic slip by up to about three times at temperatures from about 15° C. to about 32° C. Although a range of charge reductions from about 0 to about 100% are possible, it was found for 3Y TZP that reduction of the surface charge within a range between 20 and 70%, most preferably by about 50%, provided the best range of slip viscosity and drying characteristics. In general, this mild charge modification does not produce visible flocculated particles in the charge-modified slip but it does significantly alter the slip drying behavior. In the ethanol/butanol/propylene glycol slip and the methanol/2-methoxyethanol slip, acetic acid may be added in a sufficient concentration to decrease the charge on the particle by approximately 50% as measured by the electro-kinetic amplitude of the slip. Where the charge modifying agent is a solution 1:1 acetic acid and 2-propanol, the preferred acetic acid addition is from about 0.5% to about 2.5% by weight of the ceramic component and, more preferably, from about 0.75 wt. % to about 1.5 wt. %. For organic acids with longer chain lengths or branched organic acids, the preferred range will be lower, preferably from about 0.25% to about 1.5%.

With a charge-modified ceramic slip, the ceramic particles are not as free to move and drying induced shear does not overcome the particle-particle interaction brought on by the reduction in surface charge and bound dispersant. As a result, as the amount of solvent in the slip decreases during drying, the ceramic particles are unable to maintain their particle-particle spacing and begin to form ever denser regions. As these regions collapse, they undergo syneresis with the liquid being exuded from locally collapsing slip regions. The collapsing regions are typically from 5 to 50 microns in diameter and the inter-region contacts are high in solvent and have a lower density of particles. On drying and firing, these regions can be seen as lines of fine (typically sub-micron) porosity, which is indicative of the structure of the collapse. The presence of lines of submicron porosity is not found in slips that are not charge-modified to induce collapse of local regions during drying. Without these local density fluctuations, the dry slip generally has a variation in density from the top surface to the bottom. The method of the current invention eliminates the variation in density.

A binder and a plasticizer may also be added to the slip vehicle. The binder may be selected from the group of binder materials described herein. The plasticizer may comprise dibutyl phthalate, butyl phenyl phthalate, low molecular weight poly ethylene glycol or similar plasticizers.

In one embodiment, the binder is polyvinyl butyral (PVB) added to the slip vehicle in an amount (in wt. % of the ceramic slip) less than about 10 wt. %. In another embodiment, the binder is added to the slip vehicle in an amount from about 4 wt. % to about 9 wt. %, more preferably 5 wt. % to about 8 wt. % and, most preferably, from about 6 wt. % to about 7 wt. %. The plasticizer may be dibutyl phthalate added to the slip vehicle in an amount such that the ratio of binder to plasticizer is from about 0.5 to about 3.5, more preferably about 1 to about 3 and, most preferably, from about 1.5 to about 2.

After the plasticizer and binder are added, the resulting ceramic slip is homogenized with the plasticizer and binder by rolling the mixture in a ball mill shaking the mixture in a vibratory mill, or similar device to ensure binder dissolution and distribution. When a ball mill is used to homogenize the ceramic slip, the ceramic slip may be properly homogenized after about 24 hours of rolling on the ball mill. The speed of rotation of the ball mill is selected to be slow enough to avoid trapping air in the slip.

Although it is possible to produce uniform green ceramic sheets without charge modifications, the charge-modified slip is able to produce flat sheets under a wider range of drying conditions, including useful drying rates. The drying process may occur in 2 main steps. During the first step enough solvent is removed to produce a body where the particles are no longer free to move more that a few particle diameters. At this point, a majority of the solvent has evaporated. In the case of the 3Y TZP ceramic slip, this is indicated by a slight change in color and the loss of a slight blue tint. The second step in drying is the almost complete removal of solvent. During the first step, the rate of drying is controlled by the solvents chosen, the temperature, the air flow, and the solvent concentration above the drying slip.

It has been found that limiting curling in the fired tape may be accomplished by also controlling the final slip viscosity. The Herschel-Bulkley model for a viscous medium with a yield stress is as follows:

$$\tau = \tau_0 + k(\dot{\gamma})^n$$

where $\tau$ is the shear stress (D/cm$^2$), $\tau_0$ is the yield stress (D/cm$^2$), k is the viscosity, $\dot{\gamma}$ is the shear rate (1/sec) and n is the power law exponent of the shear rate. It is preferred that the flocculated slip with binder exhibit visco-elastic behavior commonly referred to a Bingham-pseudoplastic and contains both a yield stress and a non-unity value of n. Yield stress is indicative of the resistance of the particles to motion under an applied load. The viscosity during casting must be low enough to enable the ceramic slip to flow through from the reservoir to the die and out of the die while a high yield stress and rapid build of viscosity on release of shearing ensures that the slip does not move once cast and that the shear induced by drying is insufficient to initiate particle motion.

Preferred values of $\tau_0$ for the flocculated slip with binder are between about 20 and about 200, more preferably from about 60 to about 110, and most preferably, between about 70 and about 90. Preferred values of k are between about 1 and about 100, more preferably between about 20 and about 60, most preferably between about 28 and about 42. Preferred values of the power law exponential, n, are between about 0.2 and about 1, more preferably between about 0.3 and about 0.8 and most preferably, between about 0.55 and about 0.65. Typical values for slips described herein are shown in the Table 3 below. When shear rate is swept from 0 to 232 sec$^{-1}$ and back to 0 sec$^{-1}$ some degree of hysteresis may be present between the shear stress measured during the upward sweep and the shear stress measured during the downward sweep. Both upward and downward values of Hershel-Bulkley fits are shown.

TABLE 3

Herschel-Bulkley Data for Slips

| Sample # | k (upward) | n (upward) | τ (upward) | k (downward) | n (downward) | τ (downward) |
|---|---|---|---|---|---|---|
| 2 | 32.1200 | 0.6090 | 78.0000 | 27.1530 | 0.6411 | 78.0000 |
| 3 | 33.3790 | 0.6109 | 75.0000 | 25.9470 | 0.6588 | 81.0000 |
| 4 | 35.4300 | 0.6061 | 78.0000 | 33.0250 | 0.6163 | 79.0000 |
| 5 | 34.1890 | 0.6036 | 71.0000 | 28.2620 | 0.6378 | 77.0000 |
| 6 | 32.9050 | 0.6104 | 75.0000 | 29.4050 | 0.6297 | 77.0000 |
| 7 | 30.7720 | 0.6243 | 83.0000 | 31.2610 | 0.6174 | 80.0000 |
| 8 | 37.2620 | 0.5961 | 80.0000 | 30.2380 | 0.6346 | 87.0000 |
| 9 | 30.3980 | 0.6225 | 73.0000 | 26.1840 | 0.6482 | 78.0000 |
| 10 | 33.7820 | 0.6210 | 89.0000 | 33.8060 | 0.6173 | 86.0000 |
| 11 | 30.8630 | 0.6289 | 83.0000 | 29.5060 | 0.6341 | 81.0000 |
| 12 | 35.2050 | 0.6072 | 74.0000 | 32.7370 | 0.6173 | 79.0000 |
| 13 | 41.135 | 0.5716 | 71.0000 | 32.2510 | 0.6162 | 83.0000 |
| 14 | 34.122 | 0.6094 | 75.0000 | 29.3010 | 0.6300 | 84.0000 |
| 15 | 33.564 | 0.6128 | 74.0000 | 32.5090 | 0.6132 | 76.0000 |
| 16 | 29.992 | 0.6333 | 80.0000 | 30.9580 | 0.6203 | 80.0000 |
| 17 | 28.891 | 0.6264 | 73 | 28.535 | 0.6258 | 73 |
| 18 | 32.091 | 0.6116 | 72 | 26.335 | 0.6484 | 78 |
| 19 | 29.066 | 0.624 | 70 | 27.479 | 0.6313 | 71 |
| 21 | 37.754 | 0.5852 | 73 | 28.966 | 0.6347 | 84 |

The slip before flocculation and binder addition preferably shows primarily Newtonian behavior with a near linear shear rate dependence (e.g., the power law exponent n is near 1) and a low or near zero yield stress $\tau_0$. It is also preferred that the viscosity is relatively low (k is <100). For the slip before flocculation, the preferred value of k is between about 0.01 and about 100, more preferably between about 0.05 and about 1, and most preferably between about 0.09 and about 0.12. Preferred values of n are between about 0.5 and about 1, more preferably between about 0.9 and about 1, most preferably, between about 0.95 and about 0.98. Preferred values of $\tau_0$ are between about 0 and about 10, more preferably between about 0 and 1 and most preferably between about 0 and about 0.1.

With the addition of the plasticizer and binder, the resulting ceramic slip may have a ceramic solids fraction of at least 20 wt. %, more preferably at least 45 wt. %, still more preferably at least about 55 wt. %, still more preferably greater than about 63 wt. % and, most preferably, about 80 wt. %. The ceramic slip may also have a gravimetric density of greater than about 2.25 grams/cubic centimeter, a viscosity of greater than about 460 cP.

In one embodiment, before the ceramic slip is deposited on the film substrate with the tape caster, the ceramic slip is filtered to remove ceramic particle agglomerates above a certain size. For example, the filtering process may comprise passing the ceramic slip through a two stage filter. The two stage filter may comprise a first filter which passes ceramic particle agglomerates less than 20 μm in diameter and a second filter which passes ceramic particle agglomerates less than 10 μm in diameter such that, when the ceramic slip exits the filter, the ceramic slip comprises ceramic particle agglomerates less than 10 μm in diameter. In another embodiment the two stage filter may comprise a first filter which passes flocculated ceramic particle agglomerates less than 15 μm and a second filter which passes flocculated ceramic particle agglomerates less than 7 μm in diameter such that, when the ceramic slip exits the filter, the ceramic slip comprises ceramic particle agglomerates less than 7 μm in diameter.

The casting process may be chosen to provide uniform delivery of slip to the surface of the carrier film. The thin (e.g. <45 microns) nature of the green ceramic sheet makes delivery of a consistent thickness challenging for large (e.g. 100 $cm^2$) ceramic sheets for applications such as fuel cell electrolytes. The fabrication of free standing, thin, electrolyte of over 100 $cm^2$ area requires greater uniformity in green density both across the thickness of the sheet as well as across the total area of the sheet. Due to the thickness of the sheet, small variations in density cannot be accommodated for through multiple laminations and results in sheet shrinkage variation, curling and distortion. It has been found that casting rates of about 45 cm/min can produce uniformly dried green ceramic sheets that yield flat, uniform, thin ceramic sheets.

Referring now to FIG. 1, a longitudinal cross-section of a tape caster 100 is generally depicted according one embodiment described herein. The tape caster may be used to deposit and dry the ceramic slip described herein on a substrate film thereby forming a green ceramic sheet. Preferably, the tape caster and related equipment may be located in a 10,000 class filtered air environment and, more preferably, in a 1,000 class filtered air environment or a cleaner filtered air environment.

The tape caster 100 comprises a casting bed 102 enclosed by a drying chamber 132 with an exhaust 128. The casting bed 102 is spaced apart from the drying chamber 132 at either end thereby forming a delivery end or entrance 130 and a take-up end or exit 140 to the casting bed 102. The exhaust 128 may be used to flow air through the drying chamber 132 at a rate of about 12.2 m/min to about 914.4 m/min (i.e., about 40 ft./min to about 3,000 ft./min.), more preferably between about 12.2 m/min and 192.9 m/min (i.e., 40 ft./min. and about 600 ft./min.), and most preferably between 12.2 m/min and 91.4 m/min (i.e., 40 ft./min. and 300 ft./min). In one embodiment, the air is exhausted from the drying chamber at a rate of about 100 ft./min. Air may be drawn into the drying chamber through the delivery end 130 and/or the take-up end 140 of the casting bed 102.

The caster 100 may comprise a plurality of carrier film supports 116, 118 positioned in the drying chamber 132 and laterally disposed over the casting bed 102. The carrier film supports elevate the carrier film 104 over the casting bed 102 thereby preventing the carrier film from becoming scratched or otherwise damaged by contact with the casting bed 102.

Also, by elevating the carrier film 104 over the casting bed 102, the carrier film supports 116, 118 eliminate or reduce static build-up on the carrier film 104 generated by contact between the carrier film 104 and the casting bed 102 as the carrier film is drawn across the casting bed.

In one embodiment, the casting bed supports may comprise fixed (non-rotating) static support bars 116, rotating support rollers 118 and/or combinations thereof as shown in FIG. 1. Fixed support bars 116 may be used to introduce and/or control friction between the carrier film 104 and the carrier film supports 116, 118 and thereby assist in tensioning the carrier film 104 as it is drawn across the casting bed 102. While fixed support bars of a rectangular cross section are generally shown in FIG. 1, it will be understood that the fixed support bars 116 may be of any geometrical configuration suitable for supporting a carrier film. The support bars 116 may be removable and positionable such that the contact friction between the support bars 116 of the tape caster 100 and the carrier film 104 may be adjusted. In one embodiment, as shown in FIG. 1, a plurality of support bars 116 may be grouped on one half of the casting bed 102 proximate the entrance 130 while a plurality of support rollers 118 may be grouped on the other half of the casting bed 102 proximate the exit 140. In another embodiment (not shown), the support rollers 118 and support bars 116 support the carrier film 104 over the casting bed 102 for about 50% of the length of the casting bed. In yet another embodiment (not shown), the support rollers 118 and the support bars 116 support the carrier film 104 over the casting bed 102 for about 75% of the length of the casting bed. It should be understood that other relative orientations and groupings of support bars 116 and support rollers 118 may also be used.

The caster 100 may also comprise a carrier film delivery roll 106 for supplying carrier film 104 to the casting bed 102 and a carrier film take-up roll 108 for receiving carrier film that has passed through the caster 100. The carrier film may be greater than about 25 microns thick and less than about 250 µm, with a preferred thickness between about 50 µm and about 175 µm and more preferably, between about 75 µm and about 150 µm. The carrier film may comprise a polymer film such as polytetrafluoroethylene (PTFE) film, PTFE coated/laminated films, polyethylene terephthalate (PET) film, polymethylpentene (PMP), polyvynilidene fluoride film, polyetheretherketone films, ultra-high molecular weight polyethylene films, polyimide films or similar polymer films. The carrier film may be coated with silicon or carnuba to improve the release properties of the carrier film after ceramic slip deposited on the film has dried. In the embodiment shown in FIG. 1, the carrier film 104 is PTFE having a thickness of about 125 µm. However, it will be understood that the carrier film 104 may comprises other coated and uncoated polymeric films suitable for receiving a ceramic slip for forming a green ceramic sheet.

The carrier film delivery roll 106 is located proximate the delivery end or entrance 130 of the casting bed 102 while the carrier film take-up roll 108 is located proximate the take-up end or exit 140 of the casting bed 102. Carrier film 104 is drawn from the carrier film delivery roll 106 and redirected by a guide roller 134. After the carrier film 104 is redirected, the carrier film 104 is directed over a backing roller 124 and into the entrance 130 of the casting bed 102. Prior to entering the casting bed 102, a thin film of ceramic slip (not shown) may be deposited on the carrier film by the casting head 114, as will be discussed in further detail herein. After entering the casting bed, 102 the carrier film 104 traverses the casting bed 102 on the carrier film supports 116, 118 and exits the casting bed 102 at the exit 140 where it is redirected by a backing roller 124 and wound onto the carrier film take-up roll 108. The carrier film take-up roll 108 may be operatively coupled to a winding mechanism or motor (not shown) which provides rotational motion to the carrier film take-up roll 108. The rotational motion of the carrier film take-up roll 108 draws the carrier film 104 from the carrier film delivery roll 106 and through the caster 100. Accordingly, the speed of rotation of the carrier film take-up roll 108 may be used to control the rate at which the carrier film 104 is drawn through the caster 100, which, in turn, may effect the properties of the cast green ceramic sheet (not shown). Further, the speed of rotation of the carrier film take-up roll 108 may also be used to control the tension applied to the carrier film 104 in conjunction with the support bars 116. In one embodiment, the carrier film 104 may be drawn through the tape caster from about 2 cm/min. to about 500 cm/min., more preferably from about 2 cm/min. to about 100 cm/min. and, most preferably, from about 7.5 cm/min. to about 75 cm/min. In another embodiment, the carrier film may be drawn through the tape caster at about 45 cm/min.

As discussed hereinabove, as the carrier film 104 is drawn through the caster 100, the carrier film 104 may develop static from frictional contact with various components such as rollers, supports, the casting bed and the like. The carrier film 104 may even develop static from contact with itself, such as when the carrier film 104 is drawn from the carrier film delivery roll 106. This is particularly true when the carrier film 104 is a polymer material. Static build-up on the carrier film 104 may cause the film to be scratched or damaged as the carrier film 104 passes through the caster. For example, static build-up on the carrier film 104 may cause the carrier film to be drawn towards and contact the surface of the caster bed 102 which may scratch or damage the carrier film and/or create further static build-up. Scratches on the back of the carrier film 104 may result in cracks or other defects on the green ceramic sheet deposited on the carrier film. Such defects make it difficult to remove the green ceramic sheet from the carrier film 104 and may result in the defect-containing green ceramic sheet being discarded. As discussed hereinabove, the occurrence of such defects may be mitigated by using support bars 116, 118 to support the carrier film 104 over the casting bed thereby mitigating or reducing damage to the carrier film and reducing the amount of static build-up that may occur on the carrier film. Accordingly, the caster 100 may comprise one or more different static-dissipative devices positioned along the path of the carrier film 104 which may be used to mitigate or eliminate static build-up on the carrier film thereby preventing damage to the carrier film and reducing defects in the resulting green ceramic sheet.

In one embodiment, to mitigate or eliminate static build-up on the carrier film 104, the caster 100 may comprise conductive strips (not shown) disposed longitudinally and/or laterally over the surface of the casting bed 102. The conductive strips may be connected to a common ground 122 thereby dissipating and preventing the build-up of static charge either on the surface of the casting bed 102 or materials which may come in contact with the casting bed 102 such as the carrier film 104.

In another embodiment, the caster 100 may comprise a grounding brush 120 positioned proximate the entrance 130 of the casting bed 102, the exit 140 of the casting bed 102 or both such that the under side of the carrier film 104 contacts the grounding brush as the carrier film enters or exits the casting bed 102. The grounding brush 120 may comprise a conductive material that will not scratch or otherwise damage the carrier film 102. The grounding brush 120 may be connected to ground such that, when the carrier film 102 comes in contact with the grounding brush 120 any static build-up on the carrier film 104 is dissipated to ground.

In another embodiment, the caster 100 may comprise an anti-static blower 110 positioned proximate the carrier film delivery roll 106, the take up roll 108 or both. The anti-static blower 110 emits a stream of ionized air that neutralizes static charge build-up. Accordingly, by positioning the anti-static blower 110 proximate the carrier film delivery roll 106 or the take up roll 108 and directing the ionized air from the blower onto the carrier film 104, any static charge build-up on the carrier film may be neutralized as the carrier film 104 is drawn from or wound onto the rolls thereby mitigating static build up on the carrier film 104.

In another embodiment, the caster 100 may comprise one or more ion discharge bars 112. For example, as shown in FIG. 1, ion discharge bars 112 are positioned in the drying chamber 132 such that the carrier film 104 passes under and/or proximate each ion discharge bar 112 as the carrier film 104 is drawn across the casting bed 102. Similar to the anti-static blower 110, the ion discharge bars 112 emit a stream of ions that neutralizes static charge build-up. Accordingly, as the carrier film 104 passes under the ion discharge bars, any static build-up on the carrier film is neutralized by the stream of ions emitted from the ion discharge bar thereby mitigating static build up on the carrier film 104.

It should be understood that the methods and apparatus for forming green ceramic sheets shown and described herein may use any one of the aforementioned static dissipative devices or techniques or various combinations of the devices and techniques. Moreover, while specific reference is made herein to positioning certain pieces of static dissipative equipment relative to the carrier film and/or caster, it should be understood that such static dissipative equipment may be positioned at various other locations relative to the carrier film and/or caster while still achieving the same static dissipative effects. Accordingly, unless otherwise stated herein, no particular limitation is intended as to the positioning of the various pieces of static dissipative equipment described herein.

Figure 2:
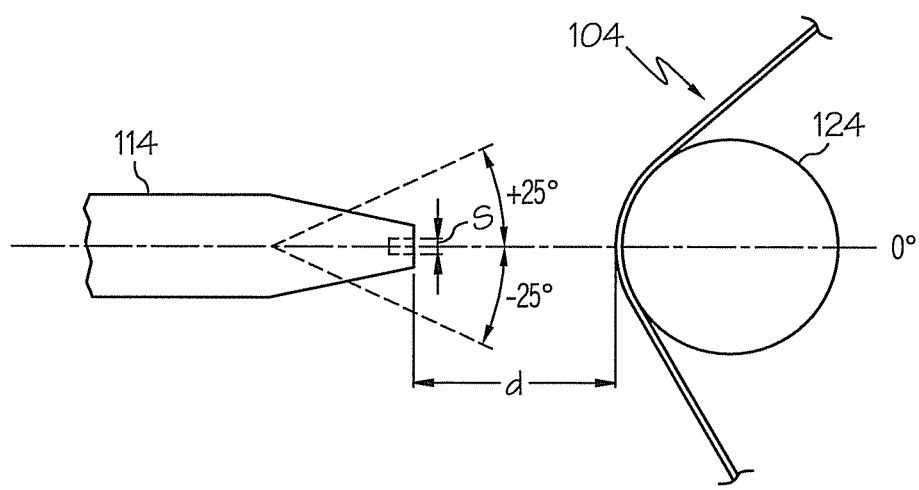
FIG. 2 is an enlarged view of a slot die used in conjunction with the tape caster of FIG. 1 according to one embodiments shown and described herein.

As discussed hereinabove, after the carrier film 104 is drawn from the carrier film delivery roll 106, but before the carrier film enters the casting bed 102, the carrier film 104 is drawn proximate to a casting head 114 where the ceramic slip is deposited on the carrier film 104. The casting head 114 may comprise a slot die, doctor blade, comma bar, roll coater or other similar coater for applying a ceramic slip to the carrier film 104. In the embodiment shown in FIGS. 1 and 2, the casting head 114 is a slot die configured to apply a film of ceramic slip along the width of the carrier film 104. The slot die may have a width of at least 15 cm such that the width of the thin film of ceramic slip deposited on the carrier film is at least 15 cm. The slot die may have a slot gap (S) (as shown in FIG. 2) which may be adjusted from about 25 μm to about 250 μm. The slot die may be oriented such that ceramic slip exits the slot die from about +25 degrees to about −25 degrees relative to horizontal (e.g., 0 degrees) or at an intermediate angle in the 50 degree range between +25 degrees and −25 degrees. In one embodiment, the slot die may be spaced apart from the carrier film 104 by a distance (d) of about 25 μm to about 300 μm, more preferably from about 50 μm to about 200 μm and most preferably from about 75 μm to about 175 μm.

The slot die may be operable to deposit a thin film of ceramic slip on the carrier film having a wet thickness of less than about 150 μm, more preferably less than about 100 μm and, most preferably, less than about 50 μm. Slip films having wet thicknesses in this range enable formation of ceramic sheets having thickness of less than about 150 μm, more preferably less than about 100 μm, and most preferably, less than about 50 μm following drying and sintering operations.

In order to deposit a thin ceramic slip of uniform thickness on the carrier film at film draw speed between 15 cm/min and 90 cm/min, the ceramic slip is delivered to the casting head 114 using a slip-metering device 136 operatively connected to the casting head 114 and comprising a gear pump (not shown) operatively connected to a separate reservoir (not shown) containing the ceramic slip. The reservoir may be pressurized. The ceramic slip may be contained in a polymer bag inside the reservoir, such as a PTFE bag or similar polymeric bag to avoid contamination of the ceramic slip. The polymer bag is connected to the casting die by a tube which passes through the lid of the hydraulic vessel by means of a compressive fitting. Hydraulic fluid is pumped into the hydraulic vessel by the precision gear pump. Propylene glycol may be used as the hydraulic fluid to limit the impact of contamination although it will be understood that other non-contaminating hydraulic fluids may also be used. The pressurized hydraulic fluid squeezes the polymer bag thereby forcing the ceramic slip into the casting head.

The slip-metering device 136 may be operable to deliver ceramic slip from the reservoir to the casting head at a predetermined rate such that the ceramic slip is deposited on the carrier film at a predetermined rate. For example, in one embodiment, the slip-metering device 136 may be operable to deliver slip from the slip reservoir to the casting head such that the slip is deposited on the carrier film at a rate of about 0.01 mL/cm/min to about 2.2 mL/cm/min. In one embodiment, to produce a 30 cm wide ceramic green sheet, the slip-metering device 136 may be operable to deliver slip to the casting head 114 such that the slip is deposited on the carrier film at a rate of about 6 ml/min when the carrier film is drawn at a rate of about 45 cm/min.

As the carrier film 104 passes proximate the casting head, the ceramic slip is applied to the carrier film thereby forming a thin film of ceramic slip on the surface of the carrier film 104. The thickness of the thin film of ceramic slip is a function of the rate at which the ceramic slip exits the casting head 114 and the rate at which the carrier film 104 is drawn from the carrier film delivery roll. Accordingly, by adjusting either rate, the thickness of the thin film of ceramic slip may be adjusted. In one embodiment, the rate at which the ceramic slip is applied to the carrier film 104 and the speed the carrier film 104 is drawn from the carrier film delivery roll 106 are selected such that the ceramic slip deposited on the carrier film has a thickness of less than about 150 μm, more preferably less than about 100 μm and, most preferably, less than about 50 μm. In one embodiment, where the casting head 104 is a 30 cm-wide slot die and the carrier film 104 is being drawn at a rate of 45 cm/min, the slip-metering device 136 may be operable to deliver the ceramic slip to the casting head 114 such that the ceramic slip is deposited on the carrier film 104 at a rate of about 6 mL/min which produces a thin layer of ceramic slip on the surface of the carrier film 104 of having a wet thickness of about 44 μm. After drying, the thickness of the green ceramic sheet on the carrier film is about 25 μm thick for the slip deposition rates and film draw rates described above.

The ceramic slip deposited by the casting head 114 onto the carrier film 104 may comprise ceramic particulate materials in a solution of various charge-modifying agents, dispersants, binders and plasticizers, as described hereinabove, such that the resulting green ceramic sheets and sintered ceramic sheets are flexible. However, while specific reference is made herein to a ceramic slip comprising zirconia being deposited onto the carrier film, is should be understood that any suitable ceramic composition for making a thin flexible sintered ceramic sheet may be deposited on the carrier film thereby producing a thin green ceramic sheet as a precursor to forming the thin, flexible sintered ceramic sheet having the desired ceramic composition.

Fabrication of a flat, thin ceramic of greater than about 100 $cm^2$ area requires slip with a consistent particle size, chemistry, solids loading, rheology for the casting process, and a specific drying rate. As described herein, very specific material and process parameters are used to achieve a slip with consistent particle size, water, surface charge, and rheology. Control of drying rate and solvent vapor pressure to limit non-uniformities, density gradients and residual stress is achieved by control of the airflow direction and airflow velocity across the drying tape as well as the gap between the tape and the top of the drying region. After the thin film of ceramic slip is deposited onto the carrier film, the carrier film with the deposited thin film of ceramic slip may be drawn through the drying chamber 132 while being supported over the casting bed 102 on the carrier film supports, as discussed hereinabove. The temperature of the drying chamber 132 may be regulated such that the temperature of the drying chamber is maintained at about 150° C., more preferably about 100° C. and, most preferably, less than about 60° C. It has been found that the air flow rates discussed herein used in conjunction with these temperature ranges are advantageous for producing uniform dried tape that remains flat on firing. These ranges yield a drying time from about 1 minute to about 15 minutes for the ethanol, 1-butanol, 1,2 Propanediol solvent system and, more preferably from about 2 minutes to about 10 minutes. These drying times enable economically viable rates of tape manufacture.

In one embodiment, as the carrier film 104 is drawn through the drying chamber 132, the carrier film 104 and thin film of ceramic slip may be heated to remove solvents from the thin film of ceramic slip by heating the interior of the caster 100, specifically the interior of the drying chamber 132. The interior of the drying chamber 132 may be heated by a plurality of heaters (not shown) disposed beneath the casting bed 102 such that heat is radiated through the casting bed 102 thereby heating the interior of the drying chamber 132. The heaters may be positioned along the length of the casting bed 102 and individually controlled such that different portions of the casting bed 102 may be heated at different rates or with different temperatures. The individually controlled heaters may also be used to establish a temperature gradient between the entrance 130 of the casting bed 102 and the exit 140 of the casting bed 102. Solvent vapors expelled from the ceramic slip may be exhausted from the drying chamber 132 through the exhaust 128. Accordingly, the independently controlled heaters may be used to control the rate at which solvents are removed from the thin film of ceramic slip and, as such, the properties of the resulting green ceramic sheet.

In another embodiment, the interior of the drying chamber 132 may be heated by circulating heated air inside the drying chamber 132. For example, air from outside the caster 100 may be drawn into the drying chamber 132 and heated using an air heater or similar device. The heated air is then circulated on the interior of the drying chamber 132 heating the drying chamber 132 to the desired temperature thereby facilitating removal of the solvents from the deposited thin film of ceramic slip on the carrier film 104 and drying the ceramic slip. Solvent vapors expelled from the ceramic slip may be exhausted from the drying chamber 132 through the exhaust 128.

In another embodiment, the drying chamber 132 is heated using both heaters disposed beneath the casting bed 102 and heated air drawn in from outside the casting bed and circulated around the interior of the drying chamber 132.

Accordingly, by passing the carrier film 104 and the thin film of ceramic slip across the casting bed 102 and through the heated interior of the drying chamber 132, solvents contained in the thin film of ceramic slip may be removed by evaporation due to the elevated temperatures inside the drying chamber 132.

In another embodiment, the drying chamber 132 is heated to a first temperature such that, when the carrier film 104 and thin film of ceramic slip are initially drawn across the casting bed 102, only a portion of the solvents are removed from the thin film of ceramic slip such that the thin film of ceramic slip is only partially dried. For example, during the initial pass of the carrier film and thin film of ceramic clip across the casting bed 102, the temperature of the drying chamber 132 may be such that only from about 97% to about 98% of the solvents are removed from the thin film of ceramic slip. Thereafter, the carrier film 104 and the partially dried thin film of ceramic slip are wound onto the carrier film take-up roll. The carrier film take-up roll 108 is then removed, put in the position of the carrier film delivery roll 106 and the carrier film 104 and partially dried thin film of ceramic slip are routed back through the casting bed 102 a second time. No additional ceramic slip is applied to the carrier film during this second pass. Instead, the drying chamber 132 is heated to a second, different temperature to remove any solvents remaining after the initial pass of the carrier film 104 across the casting bed 102. The second pass of the carrier film 104 across the casting bed 102 may be performed at the same speed as the initial pass or at a second, different speed. Further, the temperature of the drying chamber 132 may be adjusted depending on the speed at which the carrier film is drawn from the carrier film delivery roll 106 thereby altering the rate at which solvent is removed from the thin film of ceramic slip on the carrier film 104.

While specific reference has been made herein to the use of one or two passes of the carrier film 104 and thin film of ceramic slip across the casting bed 102 to facilitate drying the thin film of ceramic slip, it should now be understood that three or more passes of the carrier film 104 and thin film of ceramic slip may be used to dry the thin film of ceramic slip. Furthermore, it should also be understood that the rate at which solvent is evaporated from the thin film of ceramic slip may be controlled by adjusting the temperature of the drying chamber 132, the rate at which the carrier film 104 is drawn from the carrier film delivery roll 106 or both.

After the solvents are removed from the thin film of ceramic slip, a green ceramic sheet is left deposited on the carrier film 104. Thereafter, the carrier film with the deposited green ceramic sheet is wound on the carrier film take-up roll for subsequent processing including removal of the green ceramic sheet from the carrier film, sectioning of the green ceramic sheet, and sintering of the green ceramic sheet to form a thin flexible sintered ceramic sheet. It should be noted that, following removal of the solvents by heating, the green ceramic sheet remains flexible and pliable.

After the green ceramic sheet has been dried, the green ceramic sheet may be sectioned and the carrier film released from the green ceramic sheet. In order to take advantage of the uniformity of the green ceramic sheet, the green ceramic sheet must be removed from the carrier with little deformation. In one embodiment, the methods used for releasing the tape do not induce more than 5% deformation.

In one embodiment, to section the green ceramic sheet, the green ceramic sheet is held in place on a vacuum table (e.g., a flat surface with numerous small holes in it connected to a vacuum pump such that the suction produced by the vacuum pump holds the green ceramic sheet to the surface) while a circular blade is used to section the green ceramic sheet. The blade may be applied to the green ceramic sheet with a pressure of no greater than about 1 kg, more preferably no more than about 100 g and most preferably less than 50 g, to avoid cracking or otherwise damaging the green ceramic sheet. During the sectioning process, the green ceramic sheet may be placed on an anti-static film, such as 5 mil Anti-Static Film produced by Curbell, to reduce static build-up that may occur during sectioning. Alternatively or additionally, anti-static devices such as ion discharge bars, anti-static blowers and/or similar devices may be placed relative to the green ceramic sheet during sectioning to reduce static build-up. With the green ceramic sheet still being held by the vacuum device, the carrier film may be released from the green ceramic sheet by peeling the carrier film from the green ceramic sheet. To release the sectioned sheet from the carrier film, the sectioned green ceramic sheet is placed on a release carrier (e.g., paper, anti-static sheet, etc.) such that the surface of the green ceramic sheet is in direct contact with the release carrier. A vacuum release chuck is used to draw a vacuum on the carrier film thereby removing the carrier film from the green ceramic sheet. During the release process, static dissipative devices (e.g., ion discharge bars, static dissipative brushes and the like) may be used to ground the green ceramic sheet and vacuum release chuck to avoid static build up on the green ceramic sheet. During the sectioning and releasing process, the amount which the green ceramic sheet is stretched is less than 5%, preferably less than about 2%, more preferably less than about 1% and, most preferably, less than about 0.1%.

After the green ceramic sheet is sectioned and released from the carrier film, the green ceramic sheet is sintered to form a flexible, sintered ceramic sheet. During sintering, heat must be applied to the thin, flat ceramic sheet to avoid warping, non-uniform shrinkage and curling. At temperatures above about 800° C. the dominant means of thermal transfer is radiative. In order to have an economically viable process, multiple green ceramic sheets are fired simultaneously on thin setter boards. The setters on which electrolyte sheets are placed are stacked using spacers to create a gap between green ceramic sheets between the setters and placed in a furnace. In the current invention, radiative transfer from the furnace heating elements and walls to the green ceramic sheets being fired is facilitated by placing the spacers such that the gaps between the spacers makes up more than 50% of the space between the setters.

The temperature uniformity in the kiln may be held to less about than +/−20° C. at the maximum temperature and about +/−30° C. during heating to limit sintering stress and deformation. Larger gradients within the kiln lead to differential shrinkage and warping or curling of the fired ceramic sheet.

The green ceramic sheet typically must shrink between 10% and 30% as it sinters, typically between 20% and 25% for 3Y TZP. Accordingly, use of a setter with a smooth surface would appear to allow the ceramic sheet to contract during firing. However, it has been found that firing on smooth surface setters leads to sintering of the green ceramic sheet to the setter, destroying the sheet. Accordingly, it has been found that some surface roughness is advantageous for sintering sheets. In one embodiment, a coarse alumina plate with a ground surface, a density of less than about 80% and a rough surface. The lack of a continuous smooth surface and some surface roughness appears to enable the sheet to slide across the surface while being fired. In another embodiment, the setters may be fibrous alumina. These provide a limited number of point contacts between the sheet as it sinters and allow the sheet to move as it sinters.

Figure 3:
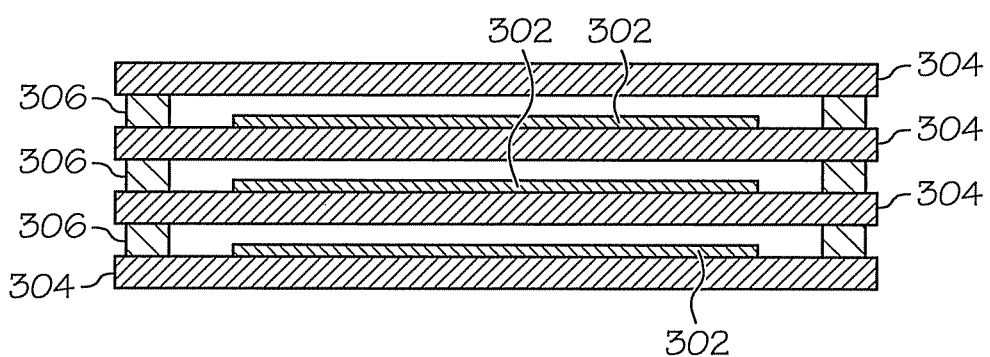
FIG. 3 depicts sectioned green ceramic sheets positioned on setters during the firing process according to one embodiment shown and described herein.

The sintering process may be performed in an air atmosphere in a filtered air environment of at least class 100,000 and, more preferably, at least class 10,000 or a cleaner filtered air environment. As shown in FIG. 3, the green ceramic sheets 302 are positioned in the sintering furnace on setters 304. The setters may generally comprise a thickness of less than about 2.6 cm. The setters may be spaced apart by spacers 306 such that the spacing between the setters is less than about 4 cm. Further, the setter stack provides for an open periphery of at least 50% for the setter supporting the green ceramic sheet being sintered.

With the green ceramic sheets positioned in the sintering furnace, the sintering furnace may be heated to a maximum temperature according to a predetermined heating schedule. For example, in one embodiment, the maximum temperature of the sintering process is from about 1100° C. to about 1600° C., more preferably from about 1300° C. to about 1550° C. and, most preferably, between about 1350° C. and about 1500° C. Once the sintering furnace has reached the maximum temperature, the sintering furnace is held at the maximum temperature for less than about 10 hours.

In one embodiment, the maximum temperature may be reached by heating the sintering furnace according to the following schedule: heating to about 220° C. in six hours (e.g. heating at a rate of about 0.5° C./min) and holding for one hour; then heating the sintering furnace to about 320° C. in 200 min. (e.g. heating at a rate of about 0.5° C./min) and holding for one hour; then heating the sintering furnace to about 400° C. in two hours (e.g., heating at rate of about 0.66° C./min) and holding for 40 minutes; then heating the sintering furnace to about 700° C. in ten hours (e.g., heating at a rate of about 0.5° C./min); and then heating to the maximum temperature (1100° C. to 1600° C.) in 25 hours (e.g., heating at a rate of about 0.27° C./min to about 0.6° C./min) and holding for two hours. Thereafter, the now sintered ceramic sheet is cooled to room temperature. In one embodiment, the sintering furnace may be cooled down to 900° C. in 135 minutes (e.g. cooled at a rate of about 1.5° C./min to about 5.2° C./min), then cooled to 600° C. in about 75 minutes (e.g., cooled at rate of about 4° C./min), and finally back to 25° C. in 120 minutes (e.g., cooled at a rate of about 4.8° C./min).

Following sintering, the edges of the sintered flexible ceramic sheet may be laser trimmed to improve the uniformity of the sheets. The resultant thin, flexible sintered ceramic sheet may be greater than about 12 cm wide and preferably less than about 150 μm thick, more preferably less than about 100 μm thick and, most preferably, less than about 45 μm thick.

A small amount of deformation can occur in the green ceramic sheets due to sintering, especially at or near the perimeter of the sheet. It has been found that the residual deformations can be addressed in one of three ways or various combinations thereof. In one embodiment, the sheet may be fired at high enough temperatures to enable some creep during the later stages of firing and thereby eliminating or mitigating curl. The sheet's slight thickness makes it possible to flatten the sheet using only gravity and a very small (fraction of a percent) creep. In another embodiment, there may be minor density gradients between the air exposed surface of the tape and the casting film surface that cause the tape to curl slightly in one direction or another on firing. This curl can be adjusted for by placing the sheet on the setter and oriented in a direction toward which the tape is likely to curl. That is, if the tape is likely to curl towards the surface in contact with the casting film, then, after release from the film, the tape is fired with the surface that was toward the casting film oriented toward the setter during firing. Additionally or alternatively, edge curl may be removed after firing using the laser cutting method described in patent application WO 2008/054774 A2.

It should now be understood that the methods and apparatus described herein may be used to form thin, flexible, sintered ceramic sheets. The methods, techniques and equipment described herein are particularly advantageous for forming thin, flexible sintered ceramic sheets that are at least 12 cm in width and preferably less than about 150 µM thick, more preferably less than about 100 µm thick and, most preferably, less than about 45 µm thick. Further, the methods, techniques and equipment described herein may be used to produce thin, flexible sintered ceramic sheets that do not contain any non-periodic holes of greater than 10 µm in diameter, no non-periodic point defects of greater than 10 µm in diameter, and no cracks greater than about 10 µm in width. This due, at least in part, to the small crystallite size of the ceramic particles used as well as the filtering the ceramic slip to remove larger ceramic particle agglomerates from the ceramic slip prior to depositing the ceramic slip on the carrier film. Moreover, by elevating the carrier film over the casting bed and using static dissipative devices, damage to the carrier film may be avoided which, in turn, reduces the number of defects in the green ceramic sheet formed on the carrier film.

Further, the methods and apparatus used herein may contribute to improving the efficiency and economy of manufacturing green ceramic sheets as reducing the number of defects which occur while forming the green ceramic sheets reduces waste and improves production output.

It should also be understood that the methods and apparatus described herein are particularly well-suited for the manufacture of thin, flexible, yttria-stabilized zirconia ceramic sheets which may be used in conjunction with solid oxide fuel cells.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A method for making a thin, free-standing ceramic sheet, the method comprising:
   drawing a carrier film proximate a casting head and across a casting bed of a tape caster at a rate from about 2 cm/min to about 500 cm/min;
   depositing a thin film of ceramic slip on the carrier film with the casting head, wherein the thin film of ceramic slip deposited on the carrier film is less than about 150 µm thick and greater than about 15 cm wide and comprises ceramic powders with an ultimate crystallite size of less than about 10 µm dispersed in a fluid vehicle such that the ceramic slip has a ceramic solids fraction of at least about 20 wt. %;
   drying the ceramic slip deposited on the carrier film as the carrier film is drawn through a drying chamber of the tape caster to form a green ceramic sheet on the carrier film, wherein the drying chamber is maintained at a temperature of less than about 150° C. as air is passed through the drying chamber at a rate from about 40 ft./min to about 3,000 ft./min; and
   sintering the green ceramic sheet on roughened setters wherein no extra weight is placed on the green ceramic sheet during sintering.

2. The method of claim 1 wherein sintering the green ceramic sheet comprises:
   positioning the green ceramic sheet on setters in a sintering furnace, wherein the setters have a thickness of less than 2.6 cm and are spaced less than 4 cm apart and the setters supporting the sintering ceramic provide an open periphery of at least 50%; and
   sintering the green ceramic sheet in an air environment by heating the sintering furnace to a maximum temperature from about 1100 20 C. to about 1600 20 C., and holding the sintering furnace at the maximum temperature for less than about 10 hours.

3. The method of claim 1 further comprising sectioning the green ceramic sheet and releasing the sectioned green ceramic sheet from the carrier film wherein:
   sectioning the green ceramic sheet comprises:
     positioning the green ceramic sheet on an anti-static film in the proximity of an anti-static device directed toward the green ceramic sheet;
     holding the green ceramic sheet with a vacuum-holder;
     cutting the green ceramic sheet with a circular blade; and
   releasing the green ceramic sheet from the carrier film comprises:
     holding the sectioned green ceramic sheet with a vacuum-holder;
     removing the carrier film from the sectioned green ceramic sheet such that the green ceramic sheet is stretched by less than about 5%.

4. A method for making a thin, free-standing ceramic sheet, the method comprising:
   drawing a carrier film proximate a casting head and across a casting bed of a tape caster at a rate from about 2 cm/min to about 500 cm/min;
   depositing a thin film of ceramic slip on the carrier film with the casting head, wherein the thin film of ceramic slip deposited on the carrier film is less than about 150 µm thick and greater than about 15 cm wide and comprises ceramic powders with an ultimate crystallite size of less than about 10 µm dispersed in a fluid vehicle such that the ceramic slip has a ceramic solids fraction of at least about 20 wt. %
   drying the ceramic slip deposited on the carrier film as the carrier film is drawn through a drying chamber of the tape caster to form a green ceramic sheet on the carrier film, wherein the drying chamber is maintained at a temperature of less than about 150° C. as air is passed through the drying chamber at a rate from about 40 ft./min to about 3,000 ft./min; and
   sintering the green ceramic sheet on roughened setters wherein no extra weight is placed on the green ceramic sheet during sintering wherein:
   the casting head comprises a slot die comprising a slot gap which may be adjusted from about 25 µm to about 250 µm;
   the slot die is spaced apart from the carrier film by less than about 300 µm and comprises an angular orientation of about −25 degrees to about 25 degrees relative to horizontal; and
   the ceramic slip is delivered to the slot die with a slip metering device comprising a gear pump such that the ceramic slip is deposited on the carrier film at a rate from about 0.01 ml/cm/min to about 2.2 ml/cm/min.

5. The method of claim 4 wherein the carrier film is from about 25 µm thick to about 250 µm thick and comprises a polytetrafluoroethylene film, a coated polytetrafluoroethylene film, a laminated polytetrafluoroethylene film, a polyethylene terephthalate film, a polymethylpentene film, a polyvinylidene fluoride film, a polyetheretherketone film, polyethylene film, or a polyimide film.

6. The method of claim 4 further comprising passing the carrier film proximate at least one static dissipative device to reduce static build up on the carrier film.

7. The method of claim 4 wherein the slip metering device comprises a gear pump and a pressurized reservoir for containing the slip.

8. The method of claim 4 wherein the method further comprises making the ceramic slip, wherein making the ceramic slip comprises:
dispersing the ceramic powder in a slip vehicle with a dispersant;
adding a charge—modifying agent to the dispersed ceramic powders in the slip vehicle; and
adding a binder and a plasticizer to the slip vehicle; and homogenizing the ceramic powder in the slip vehicle.

9. The method of claim 8 wherein the slip vehicle comprises methanol, ethanol, 1-propanol, 2-propanol, butanol, propylene glycol, ethylene glycol, acetone, methyl ethyl ketone, 2-methoxyethanol, solvents having vapor pressures of greater than 5 Torr at 25° C. and boiling points below 100° C., or combinations thereof.

10. The method of claim 8 wherein the dispersant comprises a phosphate ester.

11. The method of claim 8 wherein the charge-modifying agent comprises acetic acid.

12. The method of claim 8 wherein the binder comprises:
poly vinyl alcohol, acrylics, poly vinyl butyral, poly ethylene oxide or polyethylene glycols of various molecular weights or polyvinyl pyrrolidone;
cellulosics including hydroxymethylcellulose, hyrdroxyethylcellulose or hyrdroxypropylcellulose;
gums including agar gum or gum arabic, acrylics, vinylacrylics, acryllic acids, polyacrylamides or starches;
an emulsion including and acrylic emulsion with an aqueous liquid, binder precursors, acrylics including poly methylmethacrylate, or condensation polymers including polyfunctional acids and glycols wherein the ceramic slip contains one or more binder precursors which, with the condensation polymer, form the binder upon heating, drying or exposure to radiation or combinations thereof; or
combinations thereof.

13. The method of claim 8 wherein the plasticizer comprises dibutyl phthalate, butyl phenyl phthalate, polyethylene glycol or combinations thereof.

14. The method of claim 8 wherein the ceramic powder is an electrolyte.

15. The method of claim 8 further comprising milling the ceramic powder with the slip vehicle and dispersant in the presence of milling media.

16. The method of claim 8 wherein:
the ceramic powder comprises zirconia powders comprising crystallites with a mean diameter of less than about 1 µm;
the ceramic slip comprises a zirconia solids fraction of greater than about 45 wt % by volume;
the slip vehicle comprises, in wt. % of the ceramic slip, greater than 70 wt. % ethanol, from about 10 wt. % to about 20 wt. % butanol and less than 6 wt. % propylene glycol;
the dispersant comprises, in wt. % of the ceramic powder, less than about 6 wt. % phosphate ester;
the binder comprises, in weight percent of the ceramic slip, less than about 10 wt. % polyvinyl butyral; and
the plasticizer comprises dibutyl phthalate in an amount in weight percent of ceramic slip such that the ratio of the binder to the plasticizer is from about 0.5 to about 3.5.

17. The method of claim 16 wherein, before the ceramic slip is deposited on the carrier film, the ceramic slip is filtered with a two stage filter comprising a first filter and a second filter wherein the first filter passes ceramic particle agglomerates of less than about 20 µm and the second filter passes ceramic particle agglomerates of less than about 10 µm such that the ceramic slip comprises ceramic particle agglomerates of less than about 10 µm.

\* \* \* \* \*